United States Patent [19]

Chandler

[11] Patent Number: 4,852,843
[45] Date of Patent: Aug. 1, 1989

[54] BEVERAGE HOLDER FOR ATTACHMENT TO VEHICLE HEATING AND COOLING VENTS

[76] Inventor: Daniel E. Chandler, P.O. Box 1893, Cave Creek, Ariz. 85331

[21] Appl. No.: 241,336

[22] Filed: Sep. 7, 1988

[51] Int. Cl.[4] .............................................. A47G 29/00
[52] U.S. Cl. .................. 248/311.2; 248/215; 220/85 H; 224/42.45 R
[58] Field of Search ............ 248/102, 103, 214, 215, 248/310, 311.2, 314; 220/411, 85 H; 206/217; 215/100 R; 224/42.45 R, 42.46 R; 211/75, 88

[56] References Cited

U.S. PATENT DOCUMENTS

| | | | |
|---|---|---|---|
| 259,932 | 6/1882 | Sims . | |
| 1,296,086 | 3/1919 | Johnson . | |
| 1,314,004 | 8/1919 | Lockhart . | |
| 1,391,270 | 9/1921 | O'Daniel . | |
| 1,400,023 | 12/1921 | Carmean . | |
| 1,486,480 | 3/1924 | Brest . | |
| 2,294,151 | 8/1942 | Wooten | 211/75 |
| 2,633,278 | 3/1953 | Muniz | 248/311.2 |
| 2,811,963 | 11/1957 | Williams . | |
| 2,834,566 | 5/1958 | Bower | 248/103 |
| 2,944,779 | 7/1960 | Silagyi | 248/103 |
| 2,979,301 | 4/1961 | Reveal | 248/214 |
| 3,314,635 | 4/1967 | Frye | 248/311.2 |
| 3,532,318 | 10/1970 | Lloyd | 248/311.2 |
| 3,945,524 | 3/1976 | Tkaciukas | 248/103 |
| 4,438,637 | 3/1984 | Atkinson . | |
| 4,573,653 | 3/1986 | Boettger | 248/311.2 |
| 4,596,370 | 6/1986 | Adkins | 248/311.2 |
| 4,606,523 | 8/1986 | Statz | 220/85 H |

FOREIGN PATENT DOCUMENTS

| | | | |
|---|---|---|---|
| 516534 | 1/1931 | Fed. Rep. of Germany ... | 248/311.2 |
| 1474573 | 2/1967 | France | 215/100 R |
| 2442497 | 7/1980 | France | 224/42.45 R |

Primary Examiner—Ramon O. Ramirez
Assistant Examiner—Robert A. Olson
Attorney, Agent, or Firm—Louise S. Heim

[57] ABSTRACT

A beverage holder for mounting in an automobile includes a substantially U-shaped jacket having a curved front portion, an open back portion, and a top opening for receiving a conventional beverage container. A pair of hooks or similar fasteners is provided on the free ends of the jacket for demountably securing the holder to the louvers of the air conditioning and heating unit of the automobile. Spacing is provided between the beverage container and the jacket to allow cooled or heated air from the air conditioning and heating unit to circulate around the beverage, thus keeping a cold drink cold during summer or a hot drink hot during winter.

12 Claims, 1 Drawing Sheet

U.S. Patent  Aug. 1, 1989  4,852,843
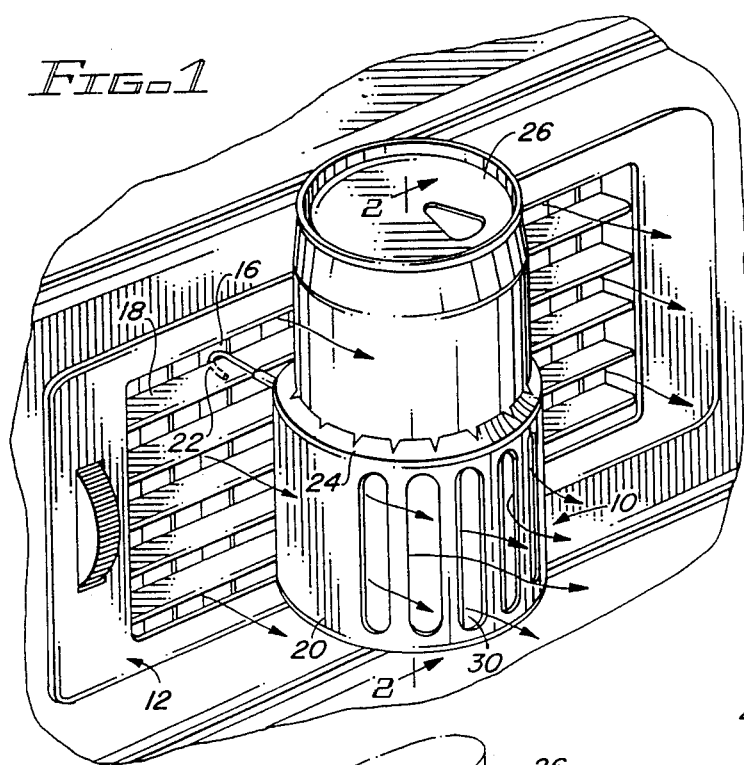
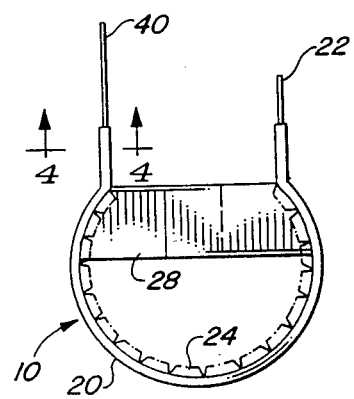
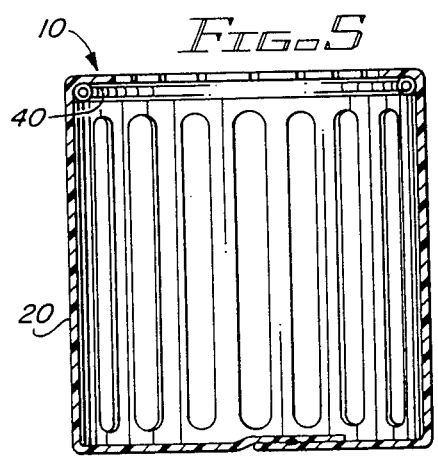
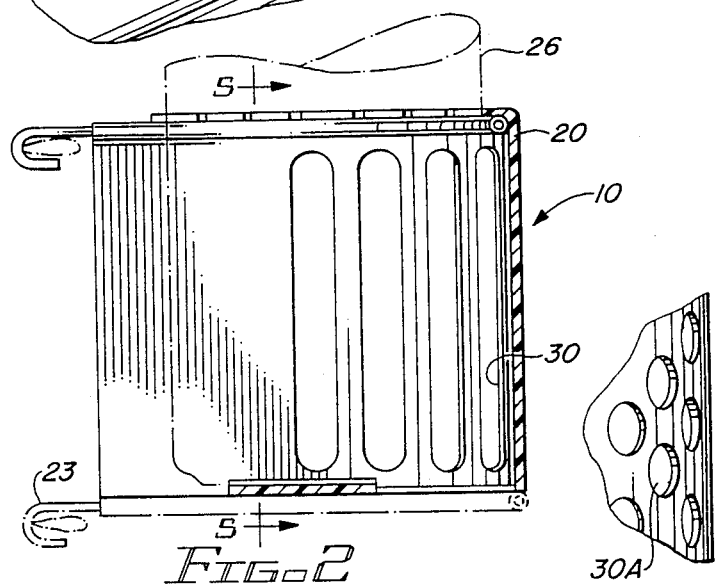
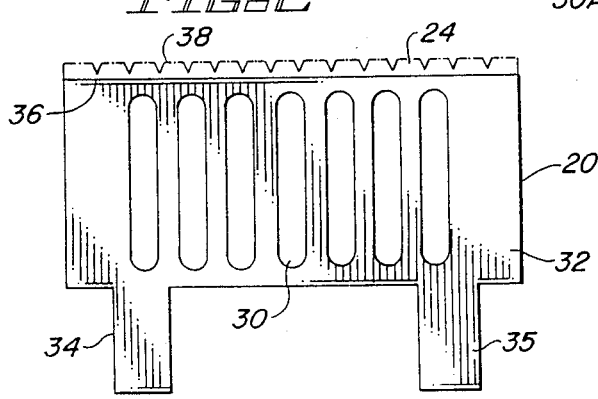
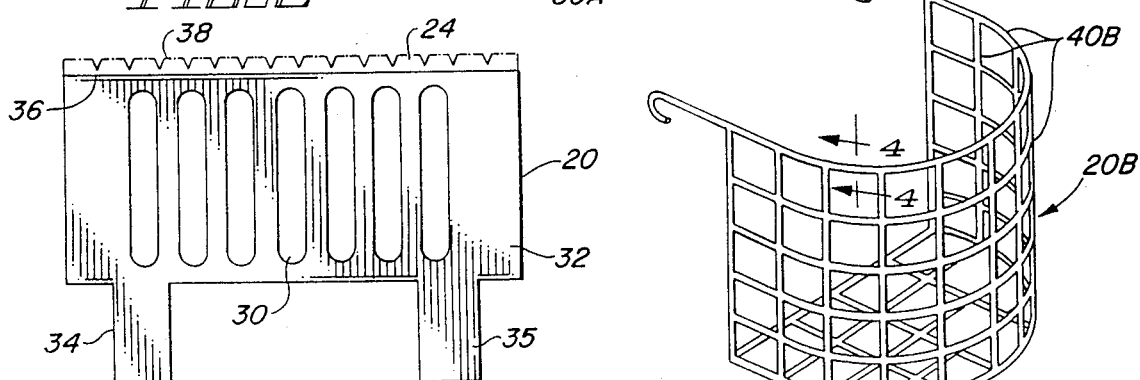
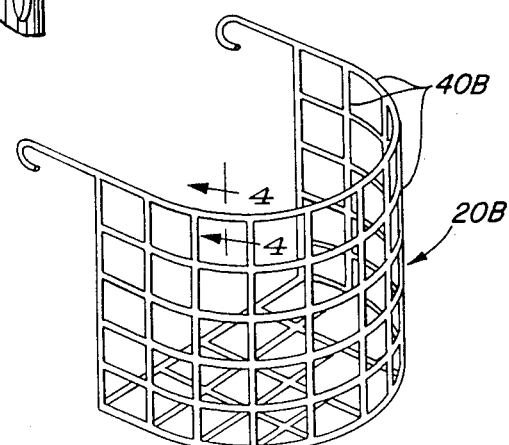

BEVERAGE HOLDER FOR ATTACHMENT TO VEHICLE HEATING AND COOLING VENTS

BACKGROUND OF THE INVENTION

1. Field of the Invention

This invention relates in general to beverage holders and, more particularly, to a hot and cold beverage holder which receives air from an automotive heating and cooling system in order to keep the beverage at a desired temperature.

2. Description of the Prior Art

Beverage holders for mounting on the dashboard, door, seats or other convenient portions of an automotive vehicle are generally well known. The purpose of these types of holders is simply to hold a beverage in a stationary position, thus freeing both hands of the driver and other passengers, and minimizing the possibility of any spillage when the vehicle accelerates, decelerates, goes over bumps, or makes sharp turns. A problem that many vehicle drivers and passengers experience, however, is that their drinks eventually lose or gain heat when left in these holders for any appreciable length of time. Thus, an ice cold soft drink will become lukewarm if mounted on the dashboard of a vehicle driving through the hot summer sun, and a steaming hot coffee will lose its warmth in a vehicle during winter. Since many drinks are unpalatable when consumed at the wrong temperature, they are often wasted.

Therefore, a need exists for a new and useful automotive beverage holder which overcomes the problems of the prior art.

SUMMARY OF THE INVENTION

In accordance with the present invention, a new and useful hot and cold beverage holder is provided with means for receiving the air from an automotive heating and cooling system in order to keep the beverage at a desired temperature.

The beverage holder comprises a subsequently U-shaped jacket, which is preferably made of a sturdy plastic material. A pair of hooks or similar fasteners is provided on the free ends of the jacket for demountably securing the holder to the louvers of an automotive air conditioning and heating unit. An inwardly turned lip is formed at the top of the jacket for retaining the beverage in a stationary position and allowing a suitable amount of spacing between the beverage and the side walls of the jacket. The spacing between the can or cup and the jacket is sufficient to allow cooled or heated air from the air conditioning and heating unit to circulate around the beverage, thus keeping a cold drink cold during summer or a hot drink hot during winter.

Accordingly, an object of the invention is to provide a hot and cold beverage holder with means for receiving the hot or cold air from a vehicle's heating and cooling system in order to keep the beverage at a desired temperature.

Another object of the invention is to provide a hot and cold beverage holder for maintaining a hot or cold beverage in a steady, upright position in a moving vehicle.

Still another object of the invention is to provide a hot and cold beverage holder with fasteners for demountable attachment to the louvers of an automobile air conditioning and heating vent.

Yet another object of the invention is to provide an automotive hot and cold beverage holder which is simple and inexpensive to manufacture and install.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view showing the hot and cold beverage holder of the present invention mounted on the louvers of an automotive heating and air conditioning unit.

FIG. 2 is a fragmentary sectional view taken through line 2—2 of FIG. 1, with the phantom lines indicating a beverage can.

FIG. 3 is a top view of the beverage can of the present invention.

FIG. 4 is a sectional view taken through line 4—4 of FIG. 3.

FIG. 5 is a sectional view taken through line 5—5 of FIG. 2.

FIG. 6 is a fragmentary view of the front surface of the beverage holder, according to an alternative embodiment of the invention.

FIG. 7 is a front view of the beverage holder before assembly.

FIG. 8 is a perspective view showing another embodiment of the invention.

DESCRIPTION OF THE PREFERRED EMBODIMENTS

Referring more particularly to the drawings, FIG. 1 shows the beverage holder 10 of the present invention mounted on the front grille 12 of a conventional automotive air conditioning or heating unit. The grille shown here includes a number of vertically extending movable louvers 16 behind a set of stationary horizontal slats 18, but the beverage holder 10 of the present invention may also be adapted for mounting on any other conventional grille configuration, such as the type in which the movable louvers extend horizontally and the stationary louvers extend vertically, as will be clear to any practitioner skilled in the art.

The beverage holder 10 comprises a substantially U-shaped jacket 20 which is preferably made from a sturdy plastic material. A pair of hooks or similar fasteners 22 is provided at the free upper ends of the jacket 20 for demountably securing the holder to the louvers 16 or slats 18 of the air conditioning and heating grille 12. If necessary for added support, a second pair of hooks 23 may be provided on the lower ends of the jacket, as shown by the dotted lines in FIG. 2.

The upper portion of the jacket 20 extends inwardly, forming a retaining lip 24 for surrounding and supporting the sides of a conventional beverage container such as a cylindrical soft drink can 26 or styrofoam coffee cup (not shown). Preferably, the lip 24 is sufficiently flexible to allow slight bending in order to conform to containers of different sizes and configurations. In addition, the bottom portion of the jacket includes a platform 28 for supporting the bottom of the beverage container.

The front portion of the jacket 20 may optionally be provided with a plurality of openings such as vertical slots 30 which allow the hot or cold air from the air conditioner or heater to exit the jacket 20. The dimensions of these slots 20 are selected to allow a sufficient amount of air to reach the passengers of the vehicle, while still retaining enough air inside the jacket 20 to heat or cool the beverage in the beverage container 26 as desired. Clearly, if openings are provided, they need not take the form of vertical slots, but could also be configured as circular holes 30A, as shown in FIG. 6, or any other suitable geometry.

Although the beverage holder 10 can be constructed in a variety of ways, one simple, inexpensive method of manufacture is described below. First, the jacket 20 is stamped or otherwise cut from a single sheet of plastic using a pattern of the shape shown in FIG. 7, which comprises a rectangular body portion 32 and a pair of leg members 34, 35 which extend from the bottom edge of the body portion 32 in a direction parallel to the side edges thereof. A plurality of openings or slots 30 are stamped or otherwise cut in the rectangular body 32. In addition, a horizontal score line 36 is formed parallel to the top edge of the body 32, thereby setting apart the retaining lip 24. A plurality of V-shaped indentations 38 may be formed along the distal edge of the retaining lip 24 to give it a toothed configuration for improving flexibility and grip.

Next, the flat jacket 20 is curved about a vertical axis to define an arc of more than 180°, and the retaining lip 24 is folded downwardly to form an inwardly extending rim. A substantially U-shaped wire 40 is then crimped or welded into place below the retaining lip 24 to give the plastic jacket 20 added rigidity. The wire 40 is preferably a flexible metallic wire, the main central portion of which has been coated with a suitable plastic material 41, as shown in FIG. 4. The uncoated distal ends of the wire are then bent from their initial straight configuration as shown on the left side of FIG. 3 to a hooked configuration 22 as shown on the right side of FIG. 3. On the illustrated embodiment, the hooks 22 are bent in a downward direction to fit over the horizontal slats 18 of the grille 12. However, in other embodiments, it may be preferable to bend the hooks sideways to fit over vertical slats or louvers, or to make other adjustments depending on the configuration of the grille. Also, as mentioned previously, a second wire having hooked ends 23 could be secured to the bottom edge of the jacket 20 if necessary. Finally, the leg members 34 and 35 are folded upwardly and chemically or sonically welded together to form a horizontal platform 28 for supporting the bottom of a beverage container 26.

In another embodiment of the invention, shown in FIG. 8, the jacket 20B could be formed as a gridlike structure made from a plurality of crisscrossing coated wires 40B.

While the principles of the invention have now been made clear in the illustrated embodiments, there will be immediately obvious to those skilled in the art, many modifications of structure, arrangements proportions, the elements, materials and components used in the practice of the invention and otherwise, which are particularly adapted for specific environments and operation requirements without departing from those principles.

I claim as my invention:

1. A beverage holder for holding a substantially cylindrical beverage container in an upright position in an automotive vehicle having a air conditioning and heating unit, said beverage holder comprising:
   (a) a sheet material forming a substantially U-shaped jacket, said jacket comprises a curved front portion including a plurality of openings, an open back portion for receiving air from the air conditioning and heating unit of said vehicle, and a top opening for receiving said substantially cylindrical beverage container in circumferentially spaced relationship therewith, said jacket having a diameter greater than the diameter of said beverage container to define a substantially annular space between said container and said jacket for retaining air from said air conditioning and heating unit and allowing said air to circulate around said container and maintain said beverage at a desired temperature; and
   (b) fastening means on the ends of said curved front portion of said jacket which comprises a pair of horizontally extending hooks for demountably securing said holder to the grille of the air conditioning and heating unit.

2. The beverage holder of claim 1, further comprising a retaining lip extending inwardly from the top edge of said jacket for surrounding and supporting the sides of a beverage container.

3. The beverage holder of claim 1, further comprising a horizontal platform extending across the bottom of said jacket for supporting the bottom of a beverage container.

4. An arrangement for maintaining a beverage at a desired temperature in an automotive vehicle, said arrangement comprising in combination:
   (a) an air conditioning and heating unit, said unit including a grille mounted on the dashboard of the vehicle for releasing treated air into the interior of the vehicle;
   (b) a beverage container having an outer diameter; and
   (c) a beverage holder for holding said beverage container in an upright position, said beverage holder including
      (i) a jacket, said jacket including a front portion for surrounding the front portion of said beverage container, an open back portion for receiving air from said air conditioning and heating unit, and a top opening for receiving said beverage container, and
      (ii) fastening means on the ends of said front portion of said jacket for demountably securing said jacket to said grille of said air conditioning and heating unit.

5. The beverage holder of claim 4, in which said front portion of said jacket comprises a plurality of openings for allowing air to pass through said jacket.

6. The beverage holder of claim 4, in which said fastening means comprises a pair of hooks for gripping the louvers of said air conditioning and heating unit.

7. The beverage holder of claim 4, further comprising a retaining lip extending inwardly from the top edge of said jacket for surrounding and supporting the sides of said beverage container, said retaining lip defining an arc of more than 180° and having an inner diameter substantially equal to the outer diameter of said beverage container.

8. The beverage holder of claim 7, in which said retaining lip includes a plurality of teeth for flexibly gripping the sides of said beverage container.

9. The beverage holder of claim 4, further comprising a horizontal platform extending across the bottom of said jacket for supporting the bottom of said beverage container.

10. The beverage holder of claim 4, in which said jacket is substantially U-shaped.

11. The beverage holder of claim 4, in which the front portion of said jacket is spaced from the sides of said beverage container to allow air to circulate between said beverage container and said jacket when said container is in said jacket.

12. The beverage holder of claim 4, in which said jacket is formed as a gridlike structure made from a plurality of crisscrossed wires.

* * * * *